US012578577B2

(12) United States Patent
Weng et al.

(10) Patent No.: US 12,578,577 B2
(45) Date of Patent: Mar. 17, 2026

(54) OPTICAL SYSTEM

(71) Applicant: TDK TAIWAN CORP., Taoyuan City (TW)

(72) Inventors: Chih-Wei Weng, Taoyuan City (TW); Chao-Chang Hu, Taoyuan City (TW); Yung-Hsien Yeh, Taoyuan City (TW)

(73) Assignee: TDK TAIWAN CORP., Taoyuan City (TW)

( * ) Notice: Subject to any disclaimer, the term of this patent is extended or adjusted under 35 U.S.C. 154(b) by 300 days.

(21) Appl. No.: 18/351,688

(22) Filed: Jul. 13, 2023

(65) Prior Publication Data

US 2024/0019705 A1     Jan. 18, 2024

Related U.S. Application Data

(60) Provisional application No. 63/388,793, filed on Jul. 13, 2022.

(51) Int. Cl.
| | |
|---|---|
| *G02B 27/01* | (2006.01) |
| *G02B 7/02* | (2021.01) |
| *G02B 27/64* | (2006.01) |
| *G03B 5/00* | (2021.01) |
| *G03B 9/06* | (2021.01) |
| *G03B 17/12* | (2021.01) |
| *G03B 30/00* | (2021.01) |
| *H02K 41/035* | (2006.01) |

(52) U.S. Cl.
CPC ........... *G02B 27/0172* (2013.01); *G02B 7/02* (2013.01); *G02B 27/0176* (2013.01); *G02B 27/646* (2013.01); *G03B 5/00* (2013.01); *G03B 9/06* (2013.01); *G03B 17/12* (2013.01);

*G03B 30/00* (2021.01); *H02K 41/0354* (2013.01); *G02B 2027/0159* (2013.01); *G03B 2205/0069* (2013.01)

(58) Field of Classification Search
CPC .......................... G02B 27/017; G02B 27/0172
See application file for complete search history.

(56) References Cited

U.S. PATENT DOCUMENTS

| | | | | |
|---|---|---|---|---|
| 5,886,822 A | * | 3/1999 | Spitzer ................. | G02B 27/144 |
| | | | | 359/633 |
| 2004/0004767 A1 | * | 1/2004 | Song .................. | G02B 27/0081 |
| | | | | 359/566 |
| 2011/0019250 A1 | * | 1/2011 | Aiki ......................... | G02B 5/32 |
| | | | | 359/861 |
| 2017/0371160 A1 | * | 12/2017 | Schultz ............. | G02B 27/0176 |
| 2021/0397004 A1 | * | 12/2021 | Schowengerdt ... | G02B 27/0172 |
| 2023/0393324 A1 | * | 12/2023 | Ueda .................. | G02B 27/0081 |
| 2024/0219732 A1 | * | 7/2024 | Miyairi .................... | H04N 5/64 |
| 2024/0353683 A1 | * | 10/2024 | Weng ................. | G02B 27/0172 |

* cited by examiner

*Primary Examiner* — Michael Stahl
(74) *Attorney, Agent, or Firm* — MUNCY, GEISSLER, OLDS & LOWE, P.C.

(57) ABSTRACT

An optical system is provided. The optical system includes an image source assembly, a light-guiding element, and a first optical element. The image source assembly is used for providing light. The light-guiding element is used for transmitting the light. The first optical element is disposed between the image source assembly and the light-guiding element and used for adjusting a path of the light.

18 Claims, 5 Drawing Sheets

1000

1040

1030

1010

1100

1900

1020

1030

1200

1420

1910

1300

1540

1050

1901

1901

1910

Z
Y
X

OPTICAL SYSTEM

CROSS REFERENCE TO RELATED APPLICATIONS

This application claims the benefit of U.S. Provisional Application No. 63/388,793, filed 2022 Jul. 13, the entirety of which is incorporated by reference herein.

BACKGROUND OF THE INVENTION

Field of the Invention

The present invention relates to an optical system.

Description of the Related Art

Augmented Reality (AR) is a technology that combines virtual world elements with the real world, allowing users to overlay virtual objects or information into their actual environment by viewing through a device's camera. Current AR optical systems primarily rely on optical projection techniques, typically using a camera to capture real-world imagery and a projector to provide virtual content, thereby projecting the virtual content alongside the real-world imagery into the user's field of view.

Virtual Reality (VR) is a simulated virtual environment created through computer technology and sensor techniques, allowing users to experience an immersive sensation. The optical system of virtual reality is one of the key technologies in VR. It is responsible for capturing, processing, and delivering visual information, enabling users to see realistic virtual scenes. Mixed Reality (MR) is a technology that combines elements of both virtual reality and augmented reality.

However, current augmented reality, virtual reality, or mixed reality devices typically require large and bulky optical components, which restrict their portability and user comfort. Users may not want to wear excessively large devices on their heads, so improving the size of augmented reality optical systems is an important challenge.

BRIEF SUMMARY OF THE INVENTION

An optical system is provided in some embodiments of the present disclosure. The optical system includes an image source assembly, a light-guiding element, and a first optical element. The image source assembly is used for providing light. The light-guiding element is used for transmitting the light. The first optical element is disposed between the image source assembly and the light-guiding element and used for adjusting a path of the light.

In some embodiments, wherein the image source assembly includes an image source, a first light path adjusting element, a collimator, and a first driving assembly. The image source is used for providing the light. The image source, the first light path adjusting element, and the collimator are arranged in a first direction. The first driving assembly is disposed on the first light path adjusting element and used for driving the first light path adjusting element moving relative to the collimator in the first direction. The collimator is used for adjusting a direction of the light to the first direction.

In some embodiments, the optical system further includes a light path adjusting assembly disposed between the image source and the light-guiding element and used for changing a path of the light. The light path adjusting assembly includes a second light path adjusting element, a third light path adjusting element, a second driving assembly, and a third driving assembly. The second driving assembly is disposed on the second light path adjusting element. The third driving assembly is disposed on the third light path adjusting element.

In some embodiments, the second driving assembly is used for driving the second light path adjusting element to rotate around a first rotational axis. The third driving assembly is used for driving the third light path adjusting element to rotate around a second rotational axis. The first rotational axis and the second rotational axis are different.

In some embodiments, the second light path adjusting element and the third light path adjusting element are arranged in a second direction. The first direction and the second direction are different.

In some embodiments, the collimator and the second light path adjusting element are arranged in the first direction. The third light path adjusting element and the first optical element are arranged in a third direction. The second direction and the third direction are different.

In some embodiments, the second light path adjusting element receives the light from the collimator. The second light path adjusting element adjusts the direction of the light from the first direction to a fourth direction. The fourth direction is different from the first direction.

In some embodiments, the third light path adjusting element receives the light from the second light path adjusting element. The third light path adjusting element adjusts the direction of the light from the fourth direction to a fifth direction. The fourth direction and the fifth direction are different.

In some embodiments, the first optical element includes a first optical element surface facing the light path adjusting assembly. A plurality of microstructures are formed on the first optical element surface. The first optical element is in direct contact with the light-guiding element. The light-guiding element includes a first light-guiding element surface and a second light-guiding element surface. The first light-guiding element surface and the second light-guiding element surface are opposite each other. The first light-guiding element surface faces the first optical element. The first optical element surface faces away from the first light-guiding element surface.

In some embodiments, wherein a ratio between a height of the microstructures and a height of the first optical element is less than 0.01.

In some embodiments, the optical system further includes a second optical element and a fourth driving assembly. The second optical element is disposed on the first light-guiding element surface. The second optical element includes a second optical element surface facing away from the light-guiding element. A plurality of microstructures are formed on the second optical element surface.

In some embodiments, the fourth driving assembly is disposed on the second optical element and used for driving the second optical element moving relative to the light-guiding element on the first light-guiding element surface. The light-guiding element extends in a sixth direction. A normal vector of the first light-guiding element surface is not parallel to the sixth direction.

In some embodiments, the light enters the light-guiding element form the first light-guiding element surface. The light exits the light-guiding element form the first light-guiding element surface. The first light-guiding element surface includes curved surface. The second light-guiding element surface includes curved surface.

In some embodiments, the optical system further includes a lens disposed on the light-guiding element. The lens and the image source assembly are disposed on opposite sides of the light-guiding element The second optical element and the lens are disposed on opposite sides of the light-guiding element. An external light sequentially passes through the lens and the light-guiding element to reach an eye. The light sequentially passes through the light-guiding element and the second optical element to reach the eye.

In some embodiments, total internal reflection does not occur at an interface between the first optical element and the light-guiding element. Total internal reflection does not occur at an interface between the second optical element and the light-guiding element.

In some embodiments, the optical system further includes a third optical element disposed between the light path adjusting assembly and the first optical element, and a fifth driving assembly disposed on the first optical element.

In some embodiments, the first optical element and the third optical element are separated from each other. The fifth driving assembly is used for driving the first optical element moving on the first light-guiding element surface relative to the light-guiding element.

In some embodiments, the first optical element includes a plurality of areas. The microstructures in the areas are different. A plurality of microstructures are formed on a surface of the third optical element.

In some embodiments, the optical system further includes a fourth optical element, wherein the second optical element is disposed between the light-guiding element and the fourth optical element. A plurality of microstructures are disposed on a surface of the fourth optical element. The light sequentially passes through the light-guiding element, the second optical element, and the fourth optical element to reach the eye.

In some embodiments, the optical system further includes a frame, a processor electrically connected to the image source assembly and disposed on the frame, an energy storage element electrically connected to the image source assembly and disposed on the frame, and a memory element electrically connected to the image source assembly and disposed on the frame. The light-guiding element, the first optical element, and the image source assembly are disposed on the frame.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
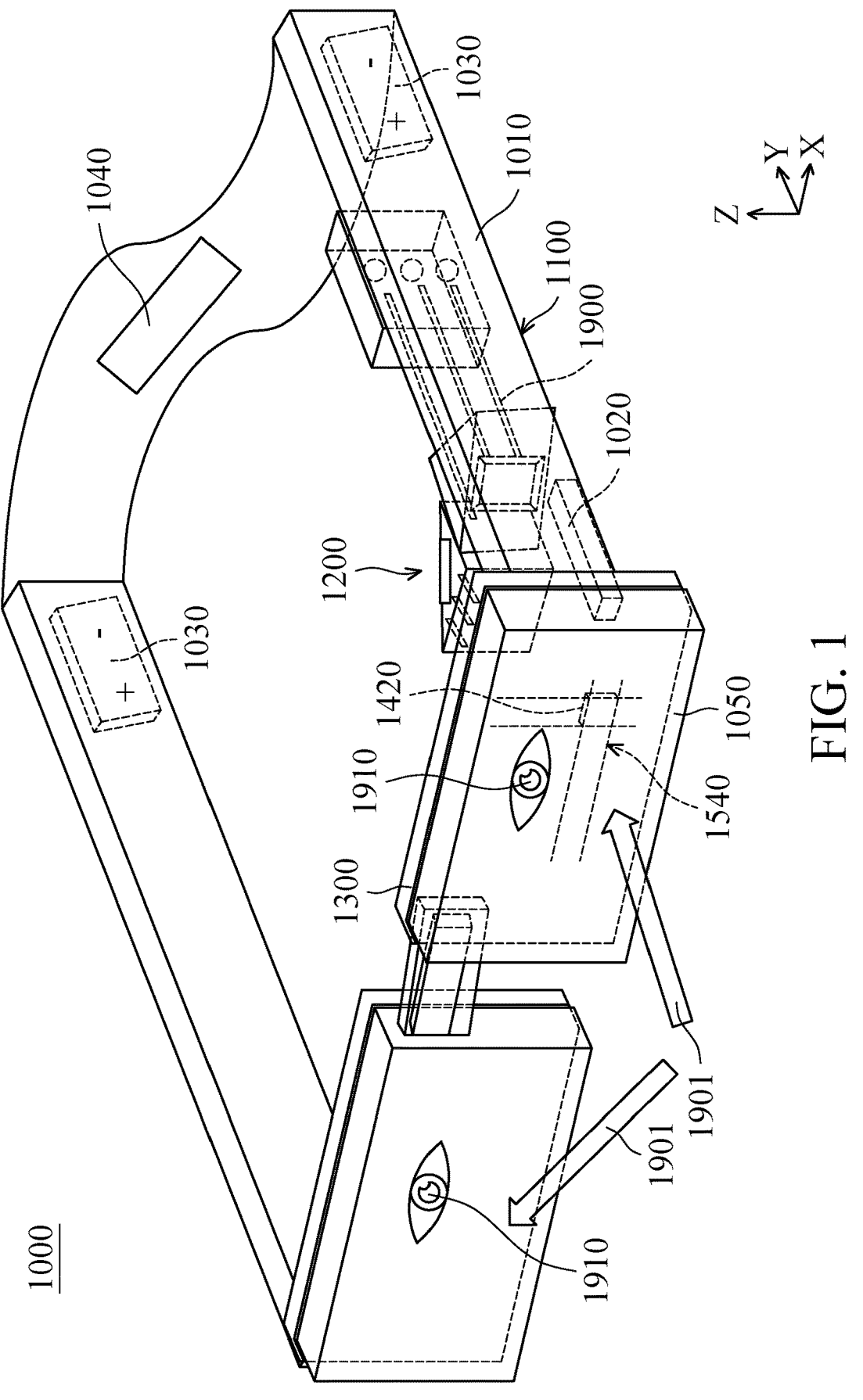
FIG. 1 is a schematic view of some elements of an optical system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
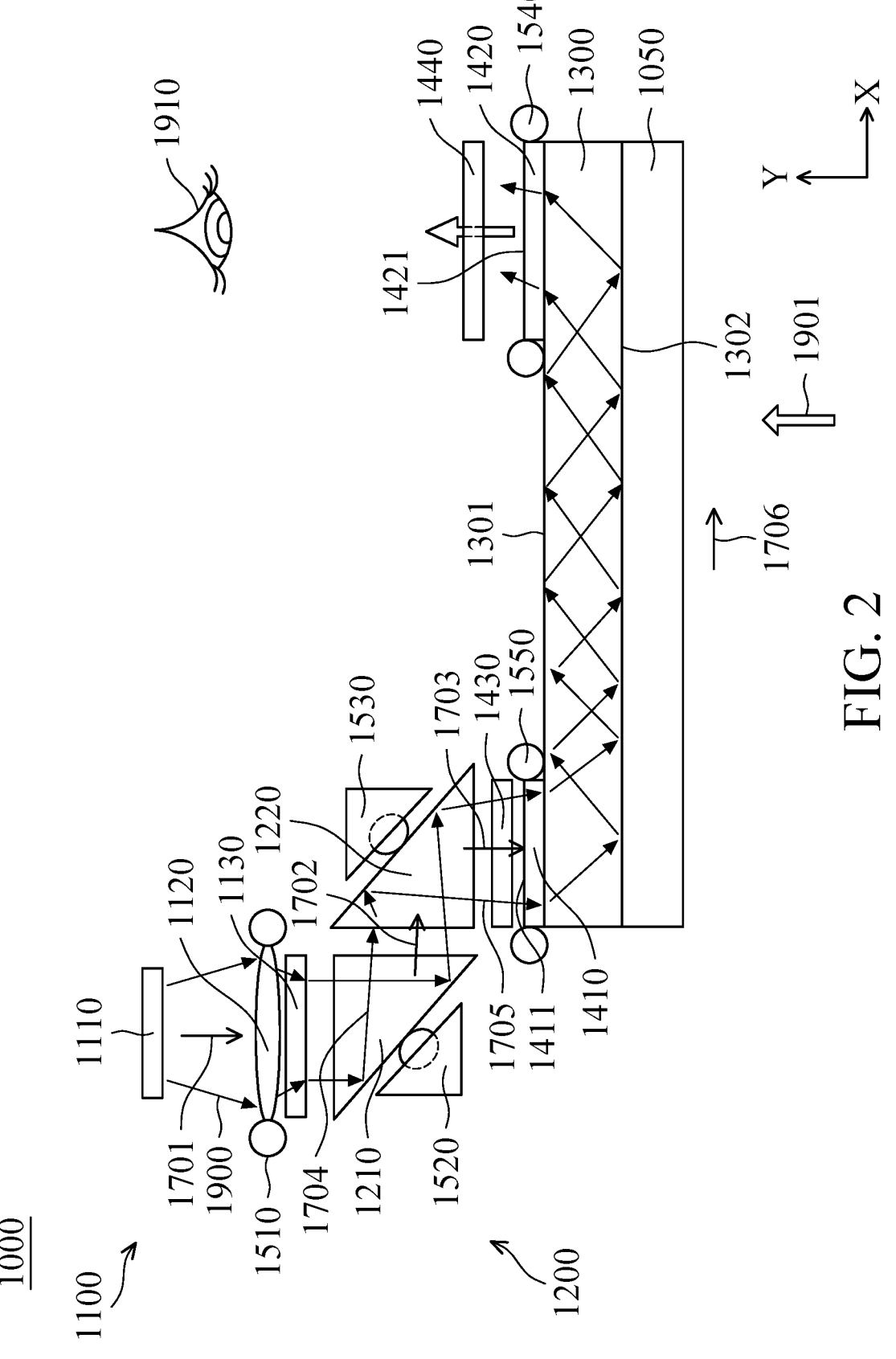
FIG. 2 is a top view of some elements of the optical system, in accordance with some embodiments of the present disclosure.

Embodiments of the present disclosure provide an optical system, particularly an optical system with augmented reality (AR), virtual reality (VR), or mixed reality (MR) capabilities. For example, FIG. 1 is a schematic view of some elements of an optical system 1000, in accordance with some embodiments of the present disclosure. FIG. 2 is a top view of some elements of the optical system 1000, in accordance with some embodiments of the present disclosure. As shown in FIG. 1 and FIG. 2, the optical system 1000 may include a frame 1010 and elements disposed on the frame 1010, such as a processor 1020, an energy storage element 1030, a memory element 1040, a lens 1050, an image source assembly 1100, and a light-guiding element 1300, etc. A light path adjusting assembly 1200 in FIG. 2 may be disposed on the frame 1010 as well.

In some embodiments, the processor 1020 may be used for processing the signals of the optical system 1000 and may be electrically connected to the energy storage element 1030, the memory element 1040, the image source assembly 1100, and the light path adjusting assembly 1200, etc. The processor 1020 may include general-purpose processor, chip multiprocessor (CMP), dedicated processor, embedded processor, digital signal processor (DSP), network processor, input/output (I/O) processor, media access control (MAC) processor, radio baseband processor, co-processor, such as complex instruction set computer (CISC) microprocessor, reduced instruction set computing (RISC) microprocessor, and/or very long instruction word (VLIW) microprocessor, or other processing devices. Processors can also include controllers, microcontrollers, application-specific integrated circuits (ASIC s), field-programmable gate arrays (FPGAs), programmable logic devices (PLDs), etc.

In some embodiments, the energy storage element 1030 may include battery (including lithium-ion batteries such as lithium-ion polymer batteries, lithium manganese batteries, lithium cobalt batteries, lithium iron batteries, etc.) and power management chips (such as power management integrated circuit (PMIC) chips) used for providing energy to the elements in the optical system 1000 for operation. In some embodiments, a port (not shown) may be used for recharging the energy storage element 1030.

In some embodiments, the memory element 1040 may be used for restoring the information that the optical system 1000 required during operation. In some embodiments, the memory element 1040 may include memory such as dynamic random access memory (DRAM) chips, static random access memory (SRAM) chips, high bandwidth memory (HBM) chips, and so on. In some embodiments, memory component memory element 1040 may also include hard drives, disks, memory cards, or any other type of media suitable for storing information.

In some embodiments, the image source assembly 1100 may be used for providing the light 1900, and the light 1900 may include a virtual image to combine with the real image and provide it to the eye 1910 to achieve augmented reality functionality.

In some embodiments, the light path adjusting assembly 1200 may correspond to the image source assembly 1100 to adjusting the light 1900 provided by the image source assembly 1100 (e.g., optical properties such as path and focal length), and the adjusted light 1900 is then provided to the light-guiding element 1300.

In some embodiments, the light-guiding element 1300 may be a waveguide corresponding to the light path adjusting assembly 1200, such as the light path adjusting assembly 1200 may be disposed between the image source assembly 1100 and the light-guiding element 1300. After the light-guiding element 1300 receives the light 1900, the light 1900 may transmit in the light-guiding element 1300 to achieve a position that can be seen by the eye 1910, and then leaves the light-guiding element 1300 to reach the eye 1910. An external light 1901 may pass through the lens 1050 and the light-guiding element 1300. Therefore, the eye 1910 may receive the light 1900 and the external light 1901 at a same time to achieve augmented reality functionality.

Referring to FIG. 2, the details of the elements of the optical system 1000 and their operation method are described.

In some embodiments, the image source assembly 1100 may include an image source 1110, a first light path adjusting element 1120, and a collimator 1130 arranged in a first direction 1701 (e.g., the Y direction). In some embodiments, the image source 1110 may be used for providing the light 1900. In some embodiments, the first light path adjusting element 1120 may include optical elements such as convex lens used for changing the direction of the light 1900. In some embodiments, the light-guiding element 1300 may be used for changing the direction of the light 1900 to the first direction 1701 to obtain the light 1900 traveling in the same direction.

Figures 3A, 3B, 3C:
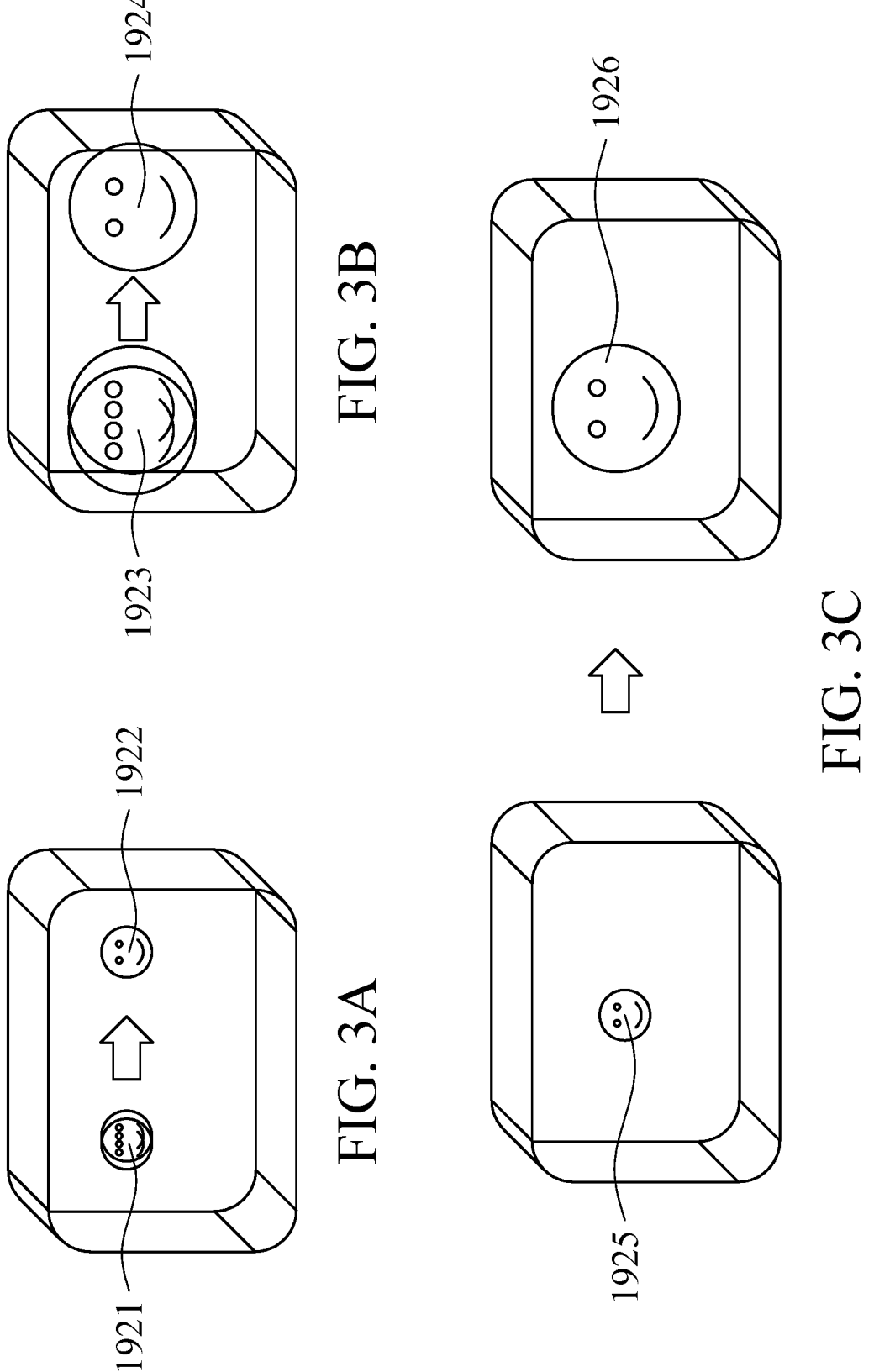
FIG. 3A and FIG. 3B are schematic views of the of the display effects of the optical system
FIG. 3C is a schematic view of the of the display effects of the optical system.

In some embodiments, the image source assembly 1100 may further include a first driving assembly 1510 disposed on the first light path adjusting element 1120 used for adjusting the position of the first light path adjusting element 1120 relative to the light-guiding element 1300. Therefore, the distance between the first light path adjusting element 1120 and the collimator 1130 in the first direction 1701 may be adjusted, such as the first light path adjusting element 1120 may be driven to move relative to the collimator 1130 in the first direction 1701. Therefore, the light 1900 is allowed to focus. For example, FIG. 3A and FIG. 3B are schematic views of the display effects of the optical system 1000. They illustrate the visual effect of the eye 1910, specifically how it perceives the light 1900. In some embodiments, a image 1921 in FIG. 3A may be transformed into a image 1922, or a image 1923 in FIG. 3B may be transformed into a image 1924, to achieve the focusing functionality. In some embodiments, the first driving assembly 1510 may include driving elements such as magnetic coils, piezoelectric elements, shape memory alloys, and so on.

In some embodiments, the light path adjusting assembly 1200 may include a second light path adjusting element 1210, a third light path adjusting element 1220, a second driving assembly 1520, and a third driving assembly 1530. The second driving assembly 1520 may be disposed on the second light path adjusting element 1210 to drive the second light path adjusting element 1210 rotating in a first rotational axis, and the third driving assembly 1530 may be disposed on the second light path adjusting element 1210 to drive the third light path adjusting element 1220 in a second rotational axis different from the first rotational axis. Therefore, the light 1900 passing through the light 1900 may be adjusted to achieve optical image stabilization (OIS).

In some embodiments, the second light path adjusting element 1210 and the third light path adjusting element 1220 may be, for example, a lens, a mirror, a prism, a reflective polished surface, an optical coating, a beam splitter, an aperture, or a liquid lens. It should be noted that the definition of the optical element is not limited to the element that is related to visible light, and other elements that relate to invisible light (e.g., infrared or ultraviolet) are also included in the present disclosure. In some embodiments, the second driving assembly 1520 and the third driving assembly 1530 may include driving components such as magnetic coils, piezoelectric elements, shape memory alloys, and so on.

In some embodiments, the second light path adjusting element 1210 and the third light path adjusting element 1220 may arrange in a second direction 1702 (e.g., the X direction), and the first direction 1701 and the second direction 1702 are different. In some embodiments, the collimator 1130 and the second light path adjusting element 1210 may also arrange in the first direction 1701 to allow the light 1900 transmitting to the second light path adjusting element 1210 in the first direction 1701.

In some embodiments, a first optical element 1410 may be provided between the image source assembly 1100 and the light-guiding element 1300, such as between the light path adjusting assembly 1200 and the light-guiding element 1300 to allow the third light path adjusting element 1220 and the first optical element 1410 arrange in a third direction 1703 (e.g., the Y direction), and the second direction 1702 and the third direction 1703 are different.

It should be noted that in some embodiments, the second light path adjusting element 1210 may receive the light 1900 from the collimator 1130 and then adjust the direction of the light 1900 from the first direction 1701 to a fourth direction 1704, and the first direction 1701 and the fourth direction 1704 are different. Afterwards, the third light path adjusting element 1220 receives the light 1900 from the second light path adjusting element 1210, and then changing the direction of the light 1900 from the fourth direction 1704 to a fifth direction 1705 different from the fourth direction 1704. Therefore, the light 1900 may leave the light path adjusting assembly 1200 in the fifth direction 1705.

In some embodiments, the first optical element 1410 may include a first optical element surface 1411 facing the light path adjusting assembly 1200. In some embodiments, a plurality of microstructures (not shown) may be formed on the first optical element surface 1411, such as columnar periodic structures, and the pitches between the microstructures may be close to the wavelength of visible light (400 nm to 700 nm). As a result, the light 1900 from the light path adjusting assembly 1200 may be adjusted as it enters the first optical element 1410 by diffraction to solve address the issue of chromatic aberration.

In some embodiments, the first optical element 1410 may include, for example, silicon wafer, and the microstructures on the first optical element 1410 may be formed by exposure, development, and etching, etc. In some embodiments, a ratio between the height of the microstructure and the height of the first optical element 1410 may be less than 0.01. For example, when the height of the first optical element 1410 is less than 100 μm, the height of the microstructure may be less than 1 μm. In some embodiments, when the first optical element 1410 is used as a convex lens, the first optical element 1410 uses quantum optical methods to manipulate the light path, which reduces the thickness to less than 10% compared to traditional convex lenses used with geometric optics. Additionally, compared to traditional convex lenses, the first optical element 1410 may achieve similar functionality with a smaller area, thereby reducing the weight of the optical system 1000 and achieving miniaturization.

In some embodiments, the first optical element 1410 may be in direct contact with the light-guiding element 1300. It should be noted that when the light 1900 traveling in the light-guiding element 1300, it can transmit within the light-guiding element 1300 through total internal reflection due to the significant refractive index difference between the light-guiding element 1300 and the surrounding air. However, since the refractive index difference between the light-guiding element 1300 and the first optical element 1410 is smaller, for example, the first optical element 1410 has a first refractive index, while the light-guiding element 1300 has a third refractive index, and the first refractive index differs from the third refractive index. As a result, the total internal reflection of the light 1900 is disrupted at the interface between the first optical element 1410 and the light-guiding element 1300, allowing the light 1900 to enter the light-guiding element 1300 at the interface that the first optical element 1410 in contact with the light-guiding element 1300.

In some embodiments, the light-guiding element 1300 may include a first light-guiding element surface 1301 and a second light-guiding element surface 1302 opposite each other. The first light-guiding element surface 1301 faces the first optical element 1410 and in contact with the first optical element 1410, and the first optical element surface 1411 faces away from the first light-guiding element surface 1301. When the light 1900 in the light-guiding element 1300 reaches the first light-guiding element surface 1301 and the second light-guiding element surface 1302, most of the light 1900 undergo total internal reflection, allowing the light 1900 to propagate within the light-guiding element 1300.

In some embodiments, the optical system 1000 further includes a second optical element 1420 and a fourth driving assembly 1540, and the second optical element 1420 may be disposed on the first light-guiding element surface 1301. Similar to the first optical element 1410 and the light-guiding element 1300, the second optical element 1420 may have a second refractive index different from the third refractive index of the light-guiding element 1300. At the interface where the second optical element 1420 contacts the light-guiding element 1300, total internal reflection of the light 1900 is disrupted, allowing the light 1900 to exit the light-guiding element 1300. In some embodiments, the fourth driving assembly 1540 may include driving elements such as magnetic coils, piezoelectric elements, shape memory alloys, and the like. In some embodiments, the light-guiding element 1300 and the fourth driving assembly 1540 may at least partially overlap in the direction perpendicular to the first light-guiding element surface 1301.

In some embodiments, the second optical element 1420 may include a second optical element surface 1421 facing the light-guiding element 1300, and a plurality of microstructures may be formed on the second optical element 1420 to achieve similar function to the first optical element surface 1411, which is not repeated again. In some embodiments, the fourth driving assembly 1540 may be disposed on the second optical element 1420 to drive the second optical element 1420 moving relative to the light-guiding element 1300 on the first light-guiding element surface 1301. The light 1900 may pass through the second optical element 1420 to reach the eye 1910, and the movable second optical element 1420 may allow the eye 1910 see the light 1900 in different locations. By utilizing the second optical element 1420 having smaller area, it is possible to simulate a larger screen and achieve the desired display effects, while also achieving miniaturization. In some embodiments, the light-guiding element 1300 may extend in a sixth direction 1706 which is not parallel to the normal vector of the first light-guiding element surface 1301. It should be noted that the light 1900 may enter the light-guiding element 1300 from the first light-guiding element surface 1301, and exit the light-guiding element 1300 from the first light-guiding element surface 1301 as well. If light is transferred through transitional waveguide, the light usually enters and exits the waveguide in two opposite surfaces. Therefore, the size of the optical system 1000 in the X direction may be reduced to achieve miniaturization. In some embodiments, the first light-guiding element surface 1301 and the second light-guiding element surface 1302 may include flat or curved surfaces, which can allow myopia, hyperopia, etc. to clearly see the external light 1901.

In some embodiments, in the sixth direction 1706, the length of the light-guiding element 1300 may be greater than the length of the first optical element 1410 and the length of the second optical element 1420 to reduce the size of the first optical element 1410 and the second optical element 1420 to achieve miniaturization.

In some embodiments, the lens 1050 may be disposed on the second light-guiding element surface 1302, and the lens 1050 may include convex lenses, concave lenses, and so on, thereby allowing individuals with nearsightedness, farsightedness, and others to see the external light 1901 clearly. In some embodiments, the lens 1050 and the image source assembly 1100 are disposed on opposite sides of the light-guiding element 1300, the lens 1050 and the second optical element 1420 are disposed on opposite sides of the light-guiding element 1300, and the lens 1050 and the fourth driving assembly 1540 are disposed on opposite sides of the light-guiding element 1300. The external light 1901 may sequentially pass through the lens 1050 and the light-guiding element 1300 to reach the eye 1910, and the light 1900 may sequentially pass through the light-guiding element 1300 and the second optical element 1420 to reach the eye 1910, thereby achieving functionality of augmented reality.

In some embodiments, the external light 1901 may also pass through the second optical element 1420. It should be noted that total reflection of the light 1900 does not occur at the interface between the first optical element 1410 and the light-guiding element 1300 (e.g., the position that the first light-guiding element surface 1301 in contact with the first optical element 1410) and the interface between the second optical element 1420 and the light-guiding element 1300 (e.g., the position that the first light-guiding element surface 1301 in contact with the second optical element 1420). Therefore, the light 1900 may enter and exit the light-guiding element 1300 from the first light-guiding element surface 1301 to increase the efficiency of light transmission of the light 1900 by the light-guiding element 1300.

In other embodiments, an additional third optical element 1430 may be disposed between the light path adjusting assembly 1200 and the first optical element 1410, and additional fifth driving assembly 1550 may be disposed on the first optical element 1410 to allow the first optical element 1410 moving relative to the third optical element 1430 on the first light-guiding element surface 1301 to achieve optical image stabilization, eye tracking, and zoom function, etc. In some embodiments, the fifth driving assembly 1550 may include driving elements such as magnetic coil, piezoelectric elements, shape memory alloys.

In some embodiments, the first optical element 1410 and the third optical element 1430 may be separated from each other, and the first optical element 1410 may have a plurality of areas with different microstructures, such as having different periodic pitches or heights to achieve various optical effects. Furthermore, in some embodiments, the surface of the third optical element 1430 (e.g., the surface facing the first optical element 1410 or facing away the first optical element 1410) may also have a plurality of microstructures with similar detail to the first optical element 1410, and it is not repeated again. By changing the position of the first optical element 1410 relative to the third optical element 1430, a zoom function may be achieved. FIG. 3C is a schematic view of the of the display effects of the optical system 1000. As shown in FIG. 3C, the image 1925 may be changed to the image 1926.

In some embodiments, the second optical element 1420 may have a plurality of areas, such as including a first area and a second area different to each other, and the microstructures in the first area and the second area are different. For example, the first area and the second area may have first microstructures and second microstructures, respectively, which may have different periodic pitches or heights to achieve different optical effects.

In other embodiments, the optical system 1000 may further include a first optical element 1410, and the second optical element 1420 is disposed between the light-guiding element 1300 and the fourth optical element 1440. In some embodiments, the surface of the fourth optical element 1440 (such as the surface facing or facing away the second optical element 1420) has a plurality of microstructures, which may have similar detail to the first optical element 1410, and it is not repeated again. In some embodiments, the light 1900 may sequentially pass through the light-guiding element 1300, the second optical element 1420 and the fourth optical element 1440 to reach the eye 1910. Since the second optical element 1420 may move relative to the fourth optical element 1440 by the fourth driving assembly 1540, such as may move in a direction parallel to the first light-guiding element surface 1301, so functions such as optical image stabilization, eye tracking, and zooming may be achieved.

Figure 4A:
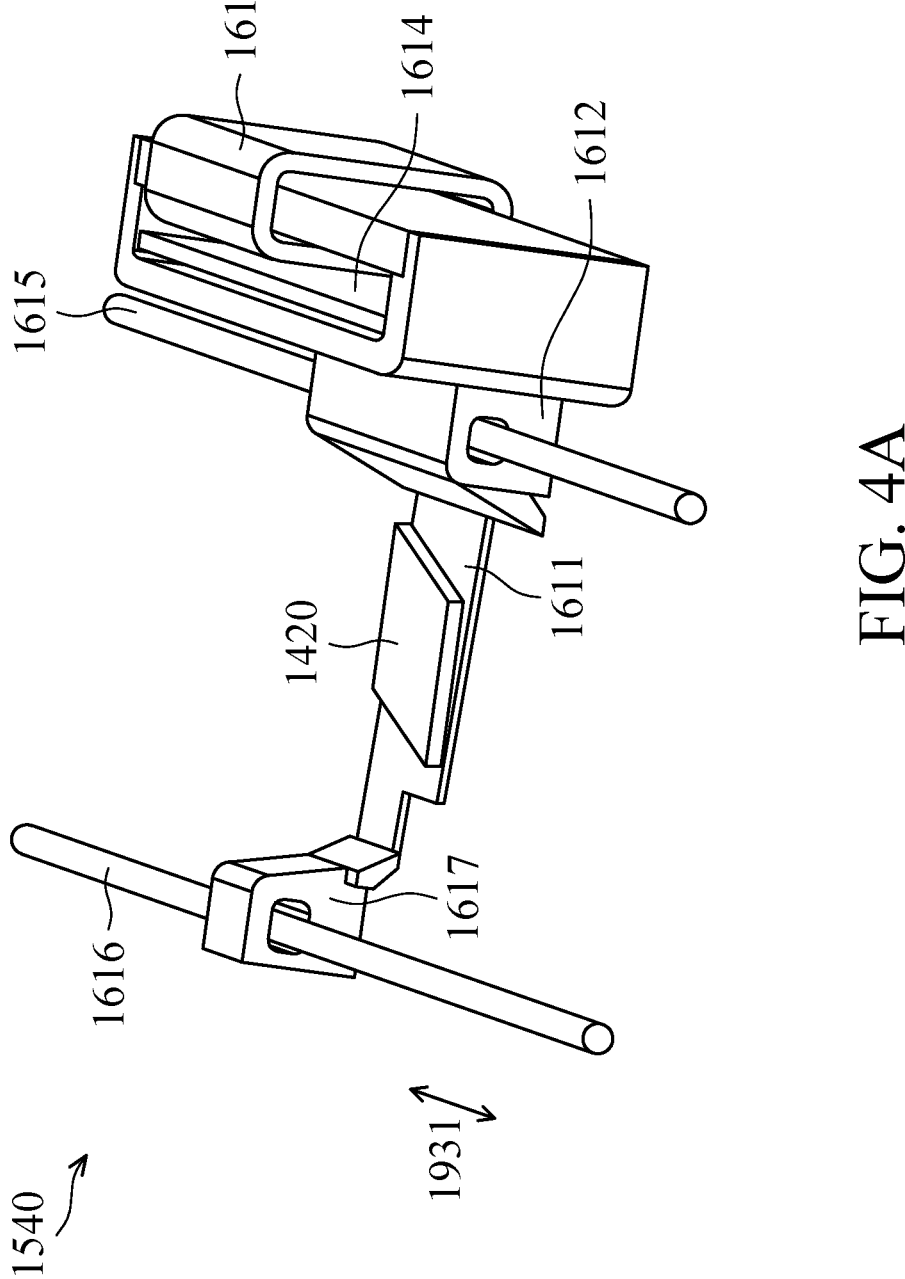
FIG. 4A and FIG. 4B are schematic views of some elements of the optical system, in accordance with some embodiments of the present disclosure.
Figure 4B:
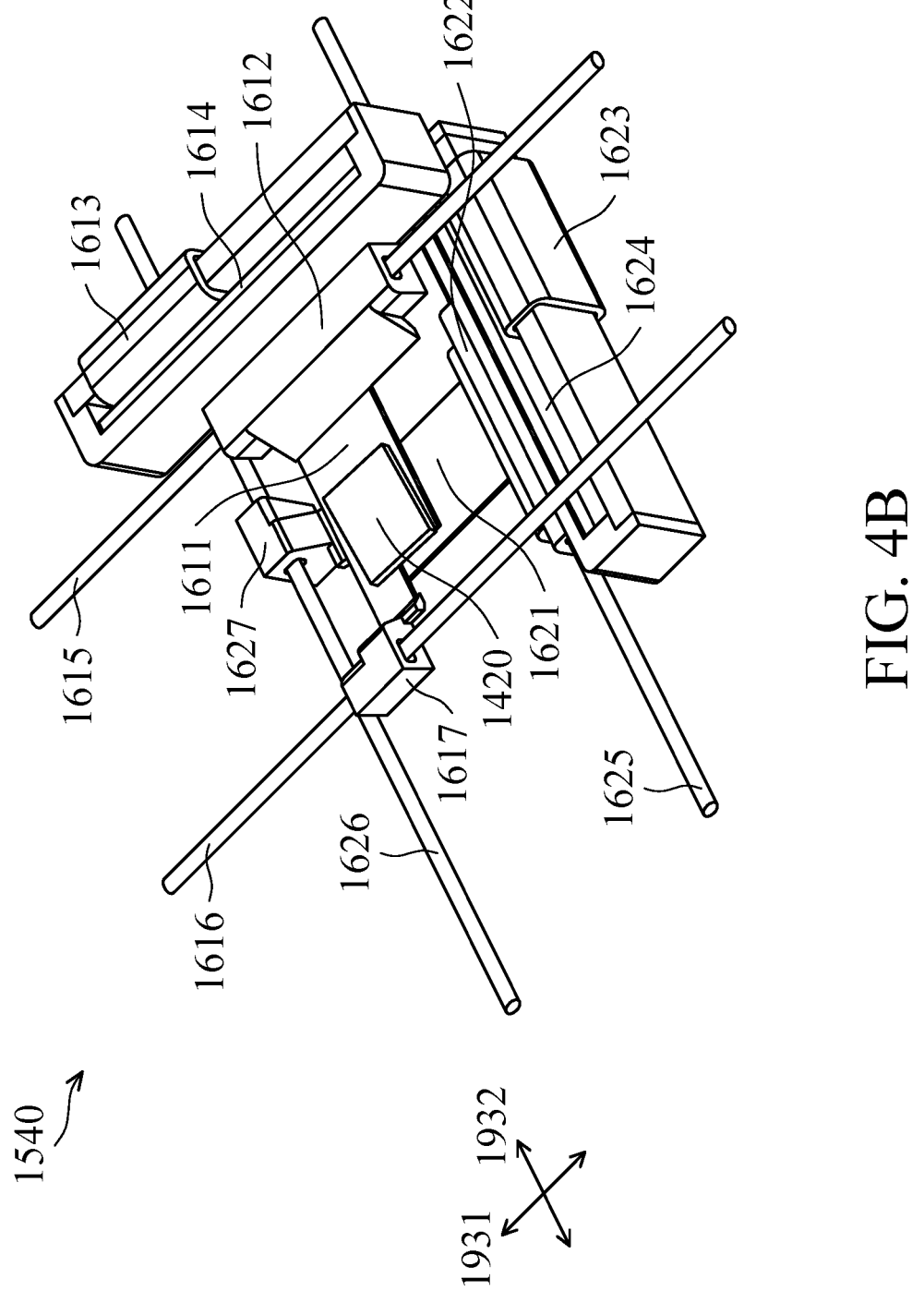

FIG. 4A and FIG. 4B are schematic views of some elements of the optical system 1000, in accordance with some embodiments of the present disclosure, which mainly show the second optical element 1420 and the fourth driving assembly 1540. As shown in FIG. 4A and FIG. 4B, the fourth driving assembly 1540 may include a first holder 1611, a first movable portion 1612, a first driving coil 1613, a first magnetic element 1614, a first track 1615, a second track 1616, and a first connecting portion 1617.

In some embodiments, the second optical element 1420 may be disposed on the first holder 1611, and the first holder 1611 and the first magnetic element 1614 may be disposed on the first movable portion 1612. The first magnetic element 1614 may move relative to the first driving coil 1613. Therefore, an electromagnetic driving force may be generated between the first magnetic element 1614 and the first driving coil 1613 to move the first movable portion 1612 relative to the first driving coil 1613. As a result, the first holder 1611 and the second optical element 1420 disposed on the first holder 1611 may move together relative to the first driving coil 1613.

In some embodiments, the first movable portion 1612 is movably disposed on the first track 1615, such as may slide in a direction that the first track 1615 extends relative to the first track 1615. The first connecting portion 1617 is movably disposed on the second track 1616 and connects to the first holder 1611. In some embodiment, the first track 1615 and the second track 1616 may have column structures, parallel to each other, and extend in a first movement direction 1931. Therefore, when the first movable portion 1612 moves relative to the first track 1615 in the first movement direction 1931, the first holder 1611 may be moved by the first movable portion 1612. Afterwards, the first connecting portion 1617 may be moved by the first holder 1611 in the first movement direction 1931 to allow the second optical element 1420 moves in the first movement direction 1931.

In some embodiments, the fourth driving assembly 1540 may further include a second holder 1621, a second movable portion 1622, a second driving coil 1623, a second magnetic element 1624, a third track 1625, a fourth track 1626, and a second connecting portion 1627. The elements in FIG. 4A

(e.g., the second optical element 1420, the first holder 1611, the first movable portion 1612, the first driving coil 1613, the first magnetic element 1614, the first track 1615, the second track 1616, and the first connecting portion 1617) may be disposed on the second holder 1621 to allow the second optical element 1420 move in another direction.

In some embodiments, the second holder 1621 and the second magnetic element 1624 may be disposed on the second movable portion 1622. The second magnetic element 1624 may move relative to the second driving coil 1623. Therefore, an electromagnetic driving force may be generated between the second magnetic element 1624 and the second driving coil 1623 to drive the second movable portion 1622 moving relative to the second driving coil 1623, and thus the second holder 1621 and other disposed on the second holder 1621 (e.g., the first holder 1611, the second optical element 1420, etc.) may be moved together relative to the second driving coil 1623.

In some embodiments, the second movable portion 1622 is movably disposed on the third track 1625, such as may slide in a direction that the third track 1625 extends relative to the third track 1625. The second connecting portion 1627 is movably disposed on the fourth track 1626 and connects to the second holder 1621. In some embodiment, the third track 1625 and the fourth track 1626 may have column structures, parallel to each other, and extend in a second movement direction 1932. Therefore, when the second movable portion 1622 moves relative to the third track 1625 in the second movement direction 1932, the second holder 1621 may be moved by the second movable portion 1622. Afterwards, the second connecting portion 1627 may be moved by the second holder 1621 in the second movement direction 1932 to allow the second optical element 1420 moves in the second movement direction 1932.

It should be noted that the first movement direction 1931 and the second movement direction 1932 may be different, such as may be perpendicular and may be parallel to the first light-guiding element surface 1301 to allow the second optical element 1420 move on the first light-guiding element surface 1301. Therefore, the position that the eye 1910 receives the light 1900 may be adjusted, and the second optical element 1420 having smaller area may be used for simulating a larger viewing range to decrease the size of the optical system 1000 and achieving miniaturization.

In some embodiments, the first holder 1611 and the first movable portion 1612 may include transparent material to avoid obstructing the sight of the eye 1910. The first holder 1611 and the second holder 1621 may include conductive material, such as indium tin oxide (ITO) to provide signal to the second optical element 1420 by the first holder 1611 and the second holder 1621.

It should be noted that the fourth driving assembly 1540 depicted here is for illustrative purposes only. The optical system 1000 can also employ other forms of fourth driving assembly 1540, such as piezoelectric elements or shape memory alloys, to drive the motion of the second optical element 1420 relative to the light-guiding element 1300.

In summary, an optical system is provided. The optical system includes an image source assembly, a light-guiding element, and a first optical element. The image source assembly is used for providing light. The light-guiding element is used for transmitting the light. The first optical element is disposed between the image source assembly and the light-guiding element and used for adjusting a path of the light. Therefore, the size of the optical system may be reduced to achieve miniaturization.

Although the previous embodiments were illustrated using augmented reality as an example, the present disclosure is not limited thereto. The aforementioned techniques may also be applied to other optical systems such as virtual reality and mixed reality, depending on the design requirements.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:

an image source assembly used for providing light and comprising an image source, a first light path adjusting element, a collimator, and a first driving assembly;

a light-guiding element used for transmitting the light;

a first optical element disposed between the image source assembly and the light-guiding element and used for adjusting a path of the light; and a light path adjusting assembly disposed between the image source and the light-guiding element and used for changing the path of the light, and the light path adjusting assembly comprises a second light path adjusting element, a third light path adjusting element, a second driving assembly, and a third driving assembly;

wherein:

the image source is used for providing the light;

the image source, the first light path adjusting element, and the collimator are arranged in a first direction;

the first driving assembly is disposed on the first light path adjusting element and used for driving the first light path adjusting element moving relative to the collimator in the first direction;

the collimator is used for adjusting a direction of the light to the first direction;

the second driving assembly is disposed on the second light path adjusting element; and the third driving assembly is disposed on the third light path adjusting element.

2. The optical system as claimed in claim 1, wherein:

the second driving assembly is used for driving the second light path adjusting element to rotate around a first rotational axis;

the third driving assembly is used for driving the third light path adjusting element to rotate around a second rotational axis; and the first rotational axis and the second rotational axis are different.

3. The optical system as claimed in claim 2, wherein:

the second light path adjusting element and the third light path adjusting element are arranged in a second direction; and the first direction and the second direction are different.

4. The optical system as claimed in claim 3, wherein:

the collimator and the second light path adjusting element are arranged in the first direction;

the third light path adjusting element and the first optical element are arranged in a third direction; and the second direction and the third direction are different.

5. The optical system as claimed in claim 4, wherein:

the second light path adjusting element receives the light from the collimator;

the second light path adjusting element adjusts the direction of the light from the first direction to a fourth direction; and the fourth direction is different from the first direction.

6. The optical system as claimed in claim 5, wherein:

the third light path adjusting element receives the light from the second light path adjusting element;

the third light path adjusting element adjusts the direction of the light from the fourth direction to a fifth direction; and the fourth direction and the fifth direction are different.

7. The optical system as claimed in claim 6, wherein:

the first optical element comprises a first optical element surface facing the light path adjusting assembly;

a plurality of microstructures are formed on the first optical element surface;

the first optical element is in direct contact with the light-guiding element;

the light-guiding element comprises a first light-guiding element surface and a second light-guiding element surface;

the first light-guiding element surface and the second light-guiding element surface are opposite each other;

the first light-guiding element surface faces the first optical element; and the first optical element surface faces away from the first light-guiding element surface.

8. The optical system as claimed in claim 7, wherein a ratio between a height of the microstructures and a height of the first optical element is less than 0.01.

9. The optical system as claimed in claim 8, further comprising a second optical element and a fourth driving assembly;

wherein:

the second optical element is disposed on the first light-guiding element surface;

the second optical element comprises a second optical element surface facing away from the light-guiding element; and a plurality of microstructures are formed on the second optical element surface.

10. The optical system as claimed in claim 9, wherein:

the fourth driving assembly is disposed on the second optical element and used for driving the second optical element moving relative to the light-guiding element on the first light-guiding element surface;

the light-guiding element extends in a sixth direction; and a normal vector of the first light-guiding element surface is not parallel to the sixth direction.

11. The optical system as claimed in claim 10, wherein:

the light enters the light-guiding element from the first light-guiding element surface;

the light exits the light-guiding element from the first light-guiding element surface;

the first light-guiding element surface comprises curved surface; and the second light-guiding element surface comprises curved surface.

12. The optical system as claimed in claim 11, further comprising a lens disposed on the light-guiding element, wherein:

the lens and the image source assembly are disposed on opposite sides of the light-guiding element;

the second optical element and the lens are disposed on opposite sides of the light-guiding element;

an external light sequentially passes through the lens and the light-guiding element to reach an eye; and the light sequentially passes through the light-guiding element and the second optical element to reach the eye.

13. The optical system as claimed in claim 12, wherein:

total internal reflection does not occur at an interface between the first optical element and the light-guiding element; and total internal reflection does not occur at an interface between the second optical element and the light-guiding element.

14. The optical system as claimed in claim 13, further comprising:

a third optical element disposed between the light path adjusting assembly and the first optical element; and a fifth driving assembly disposed on the first optical element.

15. The optical system as claimed in claim 14, wherein:

the first optical element and the third optical element are separated from each other; and the fifth driving assembly is used for driving the first optical element moving on the first light-guiding element surface relative to the light-guiding element.

16. The optical system as claimed in claim 15, wherein:

the first optical element comprises a plurality of areas;

the microstructures in the areas are different; and a plurality of microstructures are formed on a surface of the third optical element.

17. The optical system as claimed in claim 16, further comprising a fourth optical element, wherein the second optical element is disposed between the light-guiding element and the fourth optical element;

a plurality of microstructures are disposed on a surface of the fourth optical element; and the light sequentially passes through the light-guiding element, the second optical element, and the fourth optical element to reach the eye.

18. The optical system as claimed in claim 17, further comprising:

a frame;

a processor electrically connected to the image source assembly and disposed on the frame;

an energy storage element electrically connected to the image source assembly and disposed on the frame; and a memory element electrically connected to the image source assembly and disposed on the frame;

wherein the light-guiding element, the first optical element, and the image source assembly are disposed on the frame.

\* \* \* \* \*